US005569415A

United States Patent [19]
Phelps

[11] Patent Number: 5,569,415
[45] Date of Patent: Oct. 29, 1996

[54] CROSS-FLOW COOLING TOWER WITH REDUCED UPPER INBOARD FILL SECTION

[76] Inventor: Peter M. Phelps, 15 Buckeye Way, Kentfield, Calif. 94904

[21] Appl. No.: 529,334

[22] Filed: Sep. 18, 1995

[51] Int. Cl.$^6$ .................................................. B01D 47/02
[52] U.S. Cl. ........................ 261/23.1; 261/30; 261/109; 261/112.1; 261/DIG. 11
[58] Field of Search ...................... 261/30, 23.1, 112.1, 261/112.2, DIG. 11, 109, 110, 115

[56] References Cited

U.S. PATENT DOCUMENTS

| | | | |
|---|---|---|---|
| 2,854,090 | 9/1958 | Slough | 261/109 |
| 3,767,176 | 10/1973 | Engalicheff, Jr. et al. | 261/DIG. 11 |
| 3,923,935 | 12/1975 | Cates | 261/DIG. 11 |
| 4,130,613 | 12/1978 | Hourai | 261/109 |
| 4,156,706 | 5/1979 | Bell, Jr. et al. | 261/109 |
| 4,315,873 | 2/1982 | Smith et al. | 261/DIG. 11 |
| 4,460,521 | 7/1984 | Stackhouse | 261/111 |
| 4,592,877 | 6/1986 | Phelps | 261/109 |
| 4,826,636 | 3/1989 | Kinney, Jr. et al. | 261/23.1 |
| 5,023,022 | 6/1991 | Phelps | 261/111 |
| 5,029,356 | 7/1991 | Wiltz | 261/109 |
| 5,283,012 | 2/1994 | Bugler et al. | 261/23.1 |
| 5,427,718 | 6/1995 | Phelps | 261/23.1 |

FOREIGN PATENT DOCUMENTS 6-265281  9/1994  Japan ............................. 261/DIG. 11

Primary Examiner—Khanh P. Nguyen
Attorney, Agent, or Firm—Flehr, Hohbach, Test, Albritton & Herbert

[57] ABSTRACT

A crossflow cooling tower assembly (30) including a fill assembly (33) having a gas inlet opening (34) and a gas outlet opening (35). The outlet opening (35) is defined by a lower outlet portion (37) having a principal dimension generally inclined at an angle of about 5° to 15° to the vertical, and an upper outlet portion (38) having a principal dimension generally inclined at an angle of about 20° to 45° to the vertical which substantially widens an upper opening (38) into the exhaust plenum chamber (36). The cooling tower assembly (30) further includes a vertical stack (40) forming an exhaust port (41) positioned vertically over the exhaust plenum chamber (36) for exhaust of the gas in the generally vertical direction. An inner wall (43) of the vertical stack (40) is of a diameter sufficient to extend the exhaust port (41) substantially vertically over both the lower outlet portion (37) and the upper outlet portion (38). An exhaust fan (45) is positioned in the exhaust port (41) and includes at least one fan blade (46) extending substantially to the inner wall (43). This configuration enables a smooth transition of the flow of gas from the generally horizontal direction, through the fill assembly (33), to the generally vertical direction, out of the exhaust port (41).

30 Claims, 3 Drawing Sheets

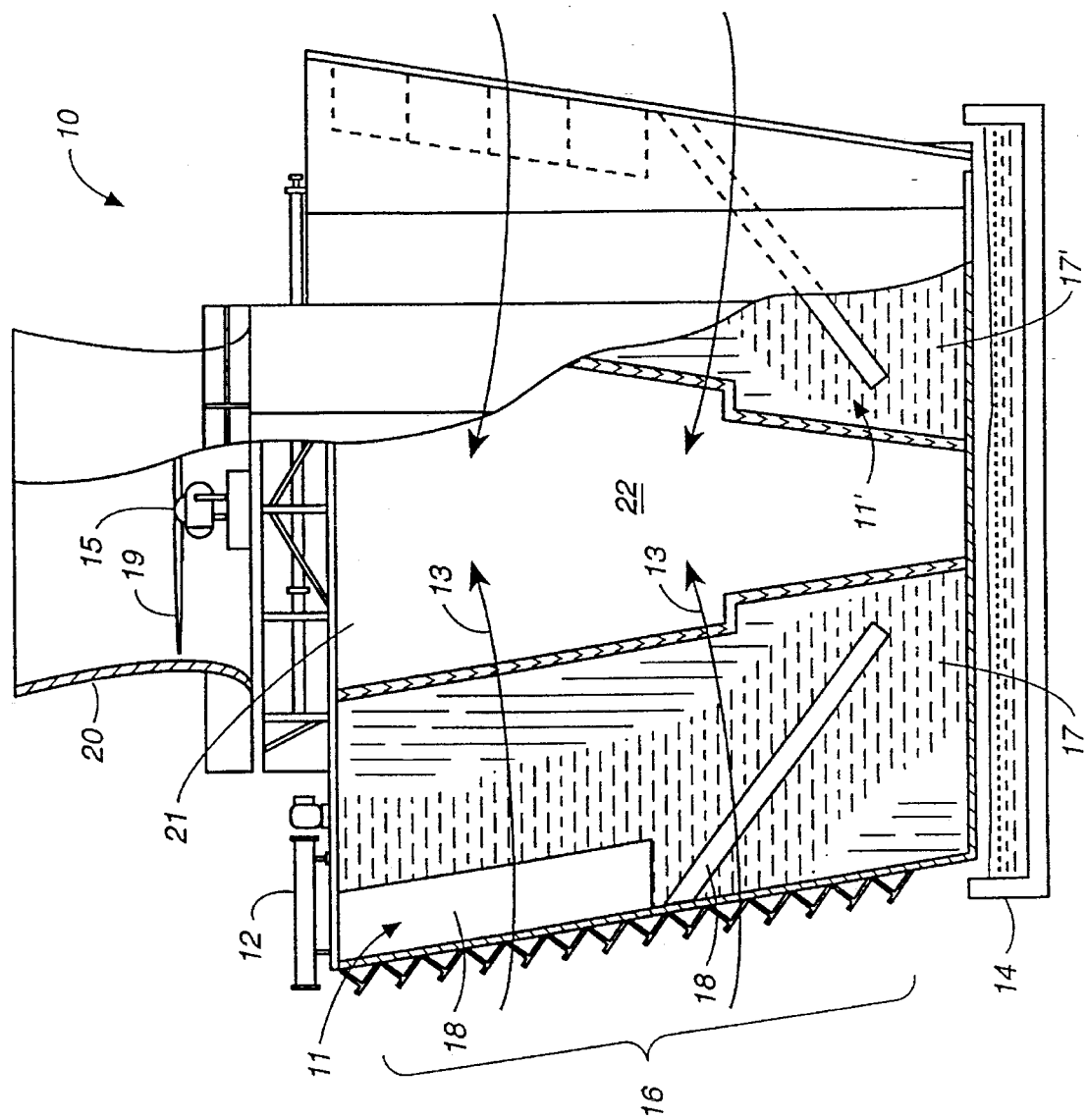
FIG._1 (PRIOR ART)

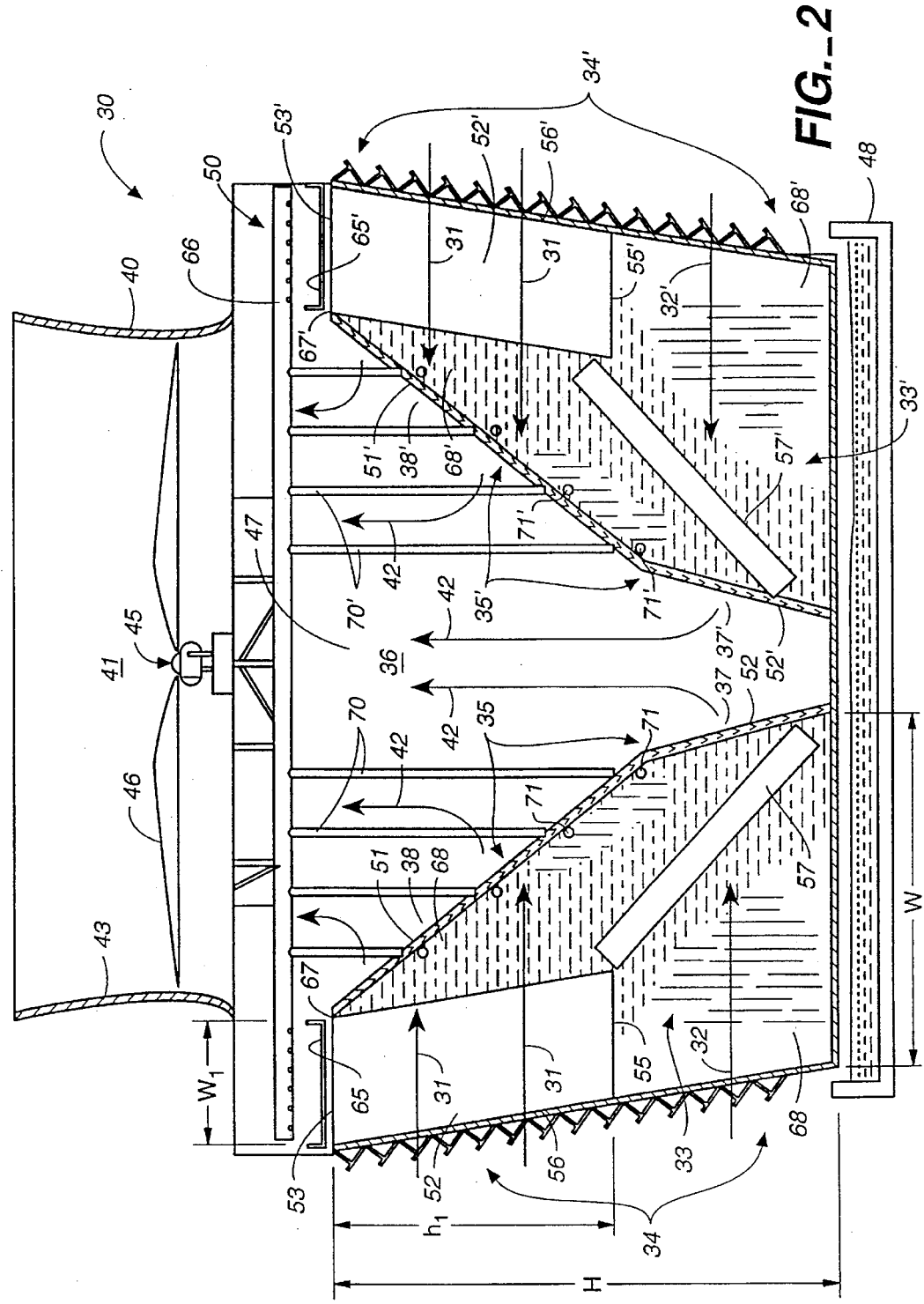
FIG._2

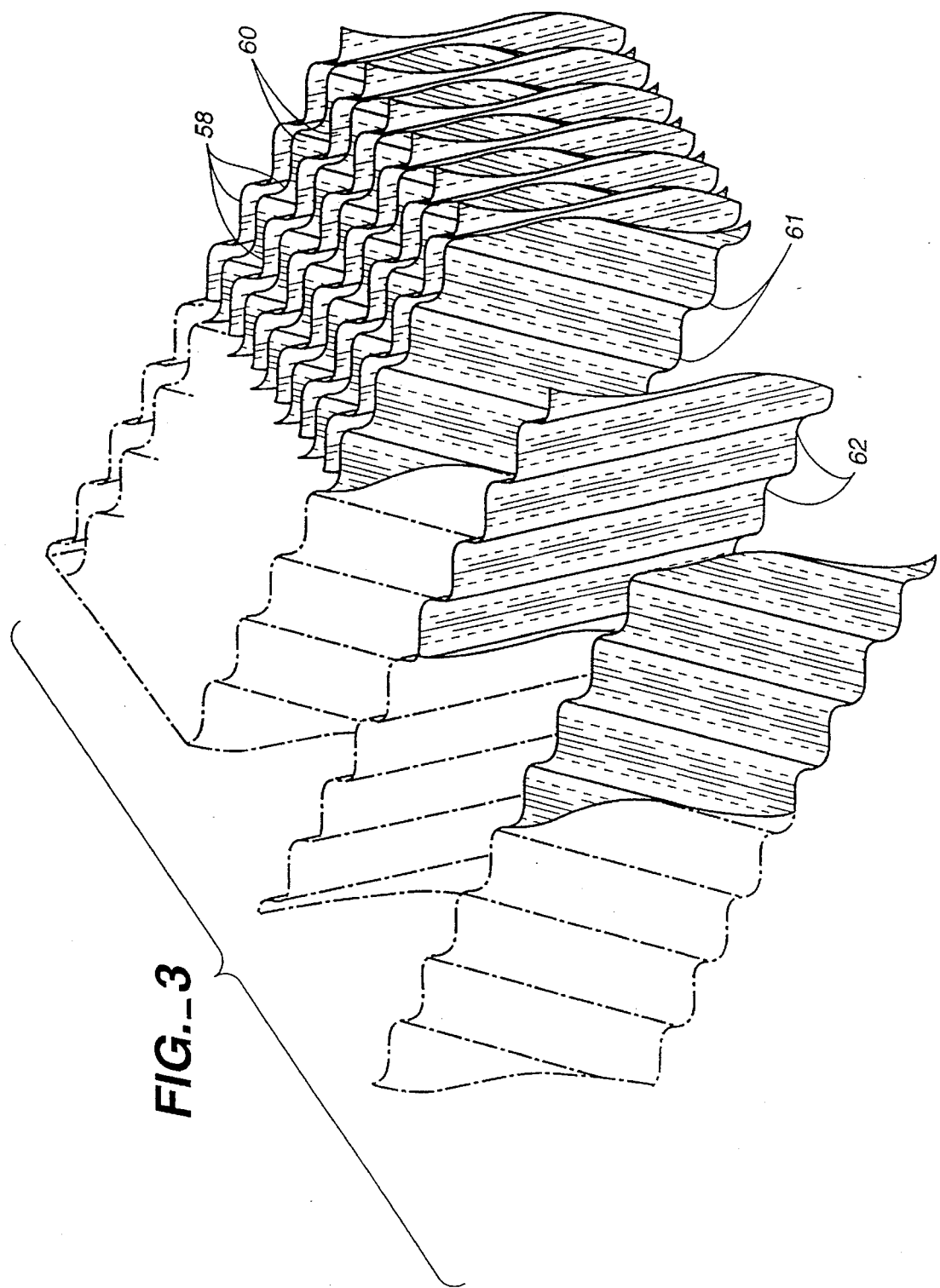
FIG._3

CROSS-FLOW COOLING TOWER WITH REDUCED UPPER INBOARD FILL SECTION

TECHNICAL FIELD

The present invention relates, generally, to fill assemblies for cooling towers, and, more particularly, relates to upper crossflow fill sections of fill stacks for cooling towers.

BACKGROUND ART

Conventional crossflow cooling towers 10, as shown in FIG. 1, are presently in widespread use and generally comprise a relatively narrow upright fill section 11 with initially hot water being fed from an overhead supply source 12 and the air being drawn horizontally therethrough from air inlets at the side of the tower 10. As the water descends in an even distribution along the upright fill section 11, the cooling crossflow air currents (arrows 13) intersect the descending water in a heat exchanging relation. Subsequently, the cooled water is collected in a water basin 14 below, while the hot, moist air is discharged into the atmosphere.

In a crossflow cooling tower, since there is no necessity for the air to make radical changes of direction into the fill and the air inlet is spaced along the entire height of the fill, the overall air pressure losses in the fill are usually less than those of a conventional counterflow tower. Hence, air can be more easily passed through the tower, such as by powered fan 15.

As illustrated in FIG. 1, crossflow fill sections 11, 11' and the framing to accommodate these sections are normally standardized designs dimensioned in a cross-sectional parallelogram configuration which primarily depend upon the size of the cooling tower 10. This cross-sectional configuration basically conforms to the drift angle or trajectory of the water as it is released from the overhead water supply source 12 and is influenced by air flowing through the gas inlet opening 16 horizontally at right angles to the falling water. Thus, this drift angle is primarily a function of the velocity of the entering air as it impinges on the falling water.

Conventional crossflow cooling towers, and some counter flow cooling towers, generally employ various varieties of splash-type fill sections 17 consisting of elongated bars of a specific configuration for dispersing the descending released water. More recently, film-type fill sections 18 have been developed which have proven substantially more efficient than splash fill sections. These typically corrugated film fills generally consist of a series of thin, opposed sheets formed of synthetic resin materials in which the water passes along the sheets in a "film". Although the film fill sections 18 may be as much as five times as efficient as splash fill sections, their substantial cost differential and higher resistance (i.e., higher static pressure) to air flow has prevented total supplanting of the latter in at least one design as shown in U.S. Pat. No. 5,023,022. In part for these reasons, the most efficient fill section designs normally incorporate splash fill 17 inboard of the film fill 18 to accommodate additional water flow.

Unfortunately, a crossflow cooling tower is inherently less efficient with respect to heat transfer than a counterflow tower based on a unit of fill. Another disadvantage of the crossflow cooling tower is that the water is loaded onto the top of the relatively thin crossflow fill. There is a maximum water load beyond which the water will not redistribute effectively because it will start gushing in a steady stream through the tower. When this maximum water load is exceeded in a crossflow tower of the film fill type, the water will not cling to the fill, leading to relatively poor heat transfer between the air and water. For example, it is not practical to consider loading film fill beyond a bulk inlet liquid velocity of about 1 meter per minute, and usually the practical limit can be 20% to 25% lower than this. On the other hand, high water loadings do expose the maximum amount of water to the high capability film surfaces, and at the same time tend to flush foulants off these film surfaces.

This water loading problem cannot be effectively overcome by horizontally widening the fill section 11 in the direction of air flow because there is a limiting factor on cooling efficiency relative to the thickness of the fill.

Typically, the uppermost coolant air, flowing horizontally across the upper portion of the fill section 11, is exposed to the hottest inlet water during the entire traverse through the fill section. This continual contact of the coolant air with this hot inlet water causes near thermal saturation of the air.

As a result, especially with the high heat transfer capability typical of film fill, the temperature of the heated air in this region of the tower 10 approaches that of the hot inlet water which it contacts as it passes into the inboard portions of the fill section 11. It is often found that the temperature of the air can be within 1° C. of the water it has cooled in these upper inboard filled portions of a tower 10. Accordingly, the ability of the air to absorb more heat when the air temperature is near the water temperature is significantly reduced.

Hence, the mere widening of the splash fill sections 17 inboard of the film fill section 18 to accommodate more water flow results in very little additional cooling performance due to the typically low heat and mass transfer capability of splash fills in general. Various fill designs have been proposed which account for this lack of performance in the upper inboard portion of the fill section 11, particularly in those towers utilizing splash fill. Usually, high performance fill is positioned in the upper outer corner of the tower where the water is at its hottest and contacts the coolest air. This condition puts crossflow cooling at its optimum capability. To maximize the amount of cooling that can occur in the upper outer corner, the water loading can be increased there so that as much of the water as practical can be exposed to this ideal condition. Typical of these patent designs include U.S. Pat. Nos.: 5,427,718; 5,283,012; 5,023,022; 4,826,636; and 4,460,521.

Another major disadvantage in widening the fill section 11 is that the resistance to air flow for the longer air path through the fill disproportionately increases in comparison to the advantages to be attained by easing the above water load problems. Film fill, particularly at high water loading, presents a high resistance (high static pressure) to air flow. As a result, it is not advantageous nor economical to utilize film fill 18 of excessive air travel thickness. Hence, this is another reason for incorporating the less resistant, more economical, splash fill 17 inboard of the film fill 18 to accommodate additional water flow.

The increased flow resistance, experienced by most cooling towers incorporating film fill sections, is typically compensated by increasing the fan power or capacity which draws air from the exhaust plenum chamber. This increase in capacity is usually accomplished by increasing the blade diameter. However, for air flow efficiency reasons and for the proper fan performance, to accommodate a larger diameter blade 19 of fan 15, the overall tower structure must be increased rather than merely increasing the diameter of the exhaust stack 20 housing the fan 15. Similar air flow efficiency considerations apply to natural draft cooling towers where the fan is replaced by a high stack.

As a general rule, the tip of the stack 20 should not substantially extend horizontally outboard past the upper opening 21 of the exhaust plenum chamber 22 (FIG. 1). Such an arrangement adversely affects the fan or stack efficiency since the exhausted air from exhaust plenum chamber 22 cannot be directly supplied, in the vertical direction, to the outer portions of the fan 15 or stack 20 which extend over the fill section 11. The air exhausted by these outer portions of the fan would have to travel in a direction vertically through upper opening 21 and then diagonally over the fill section 11 before reaching the outer fan portions. Moreover, this can further decrease the life of the fan 15 since the blades tend to unload as they pass across the area of the disturbed air flow above the fill. This sporadic unloading results in excessive blade vibration.

Accordingly, fan blade 19 and stack 20 are preferably diametrically similar to and are positioned vertically above the upper opening 21, as shown in FIG. 1. The problem with this design limitation is that the maximum fan dimensions are largely dictated by the height and slope of the fill section gas outlet portion, as well as the separation between the opposing fill sections 11, 11'. For instance, the improved cooling capability of film fill, as opposed to splash fill, enables lower cooling tower heights. In turn, the lower tower height requires volumetrically less air traveling through the tower than a standard, taller, all splash fill tower. Hence, it is reasonable to deduce that a smaller capacity fan, and therefore a small upper opening, would be appropriate.

This is not the case, however. In a smaller diameter fan, the working area and the corresponding air moving capability of the fan is reduced by the square of the diameter. Thus, the normal air requirement is reduced in direct proportion to the fill section height, while the working exhaust area into the fan or stack is reduced by the square of the reduction in the fill section height. Not only is the air flow that can be drawn into and exhausted from a tower cell limited, but also the length of the cell that the smaller fan can service must be reduced.

Another problem associated with a crossflow cooling tower having too small an upper opening is that as the air flows horizontally through the fill section 11 and exits into the exhaust plenum chamber 22, it must turn upwards 90° to exit through exhaust stack 20. The incoming air must then compete for space as it cumulatively enters the exhaust plenum chamber. Hence, directional transitions of the air flowing into the plenum chamber which are not smooth may result in problematic internal pressure losses which result from high velocity air currents turning upward and competing for limited plenum volume.

The above-mentioned flow problems can be remedied through widening of the upper opening 21 to accommodate a larger capacity fan. This is usually accomplished by spacing the two opposing fill sections 11, 11' further apart or increasing the height of fill sections, or a combination thereof. The former structural arrangement results in a wider tower, while the latter causes an increase the overall height of the tower.

DISCLOSURE OF INVENTION

Accordingly, it is an object of the present invention to provide a reduced width crossflow cooling tower assembly which generally maintains the cooling capabilities of conventional crossflow cooling towers.

Another object of the present invention is to provide a reduced width crossflow cooling tower assembly which effectively accommodates an increased cooling capacity fan or natural draft stack.

Yet another object of the present invention is to provide a crossflow cooling tower assembly which provides a smooth airflow transition from a horizontal flow direction to a vertical flow direction in the exhaust plenum chamber.

Still another object of the present invention is to provide a crossflow cooling tower assembly which decreases the transverse flow of air to reduce air resistance.

It is a further object of the present invention to provide a crossflow cooling tower assembly which is compact, easy to maintain, has a minimum number of components, and is economical to manufacture.

In accordance with the foregoing objects, the present invention provides a crossflow cooling tower assembly for contacting generally horizontally flowing gas (air) in cooling relationship with generally vertically descending liquid (water). The cooling tower assembly includes a fill assembly having a gas inlet opening and a gas outlet opening. These openings enable the flow of gas, over substantially the entire vertical height of the fill assembly, into an exhaust plenum chamber of the tower assembly. The outlet opening is defined by a lower outlet portion having a principal dimension generally inclined at an angle of about 5° to 15° to the vertical, and an upper outlet portion having a principal dimension generally inclined at an angle of about 20° to 45° to the vertical. The upper outlet portion begins from a location proximal the lower outlet portion at about ⅓ to ⅔ the vertical height of the fill assembly.

The cooling tower assembly further includes a vertical stack forming an exhaust port positioned vertically over the exhaust plenum chamber for exhaust of the gas in the generally vertical direction. An inner wall of the vertical stack is of a dimension sufficient to extend the exhaust port substantially vertically over both the lower outlet portion and the upper outlet portion. Further, the inner wall extends to a location proximal an innermost upper portion of the fill assembly.

An exhaust fan can be positioned in the exhaust port and includes at least two blades extending substantially to the inner wall. Further, the blade extends substantially vertically over both the lower outlet portion and the upper outlet portion. This configuration provides a plenum large enough to enable a smooth transition of the flow of gas from the generally horizontal direction, through the fill assembly, to the generally vertical direction, out of the exhaust port.

The fill assembly preferably includes an upper film fill section disposed in an upper outboard corner of the tower assembly proximal to the gas inlet opening and liquid supply source. Further, the fill assembly includes a sloping film fill section having a principal plane inclined at an angle of about 20° to 70° to the vertical. The sloping film fill section extends from a location proximal a portion of the upper film fill section to a location proximal a bottom of the lower outlet portion of the gas outlet opening so that substantially all of the gas flowing from the gas inlet opening to the gas outlet opening flows through at least one of the upper and sloping film fill sections.

BRIEF DESCRIPTION OF THE DRAWING

The assembly of the present invention has other objects and features of advantage which will be more readily apparent from the following description of the Best Mode of Carrying Out the Invention and the appended claims, when taken in conjunction with the accompanying drawing, in which:

FIG. 1 is a schematic side elevation view, partially broken away, of a prior art crossflow cooling tower employing a sloped film fill assembly.

FIG. 2 is a schematic side elevation view of a crossflow cooling tower having a widened upper opening into the exhaust plenum chamber constructed in accordance with the present invention.

FIG. 3 is an enlarged, fragmentary, schematic, top perspective view of corrugated film fill typically employed in the present invention.

BEST MODE OF CARRYING OUT THE INVENTION

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

As above-mentioned, prior art cooling tower designs often concentrate cooling efforts at the upper portions of the film assembly where the descending water, at its hottest, contacts the coolest air. Hence, cooling tower designers generally maximized water flow by adding additional fill at this upper portion, while taking into account the additional air flow resistance, to increase cooling tower performance. The present invention is also primarily concerned with the utilization of the upper outboard film-type fill stacks or sections in combination with upper inboard splashtype or open film fill sections in a gas-liquid contact tower. It has been found, however, that removal of an upper inboard, triangular-shaped, fill portion from the fill assembly creates favorable conditions which enable the cooling tower assembly to be reduced in size, while minimizing cooling performance losses.

Although useful in gas stripping towers and the like, such towers will be designated "cooling towers" herein as they are most commonly utilized for cooling liquid, such as water, by inducing the surrounding gas, air, into the tower to contact and thereby cool the water. As will be apparent, a number of different film fill types may be employed in accordance with the invention.

Attention is now directed to FIG. 2 where a crossflow cooling tower, generally designated 30, is illustrated for contacting generally horizontally flowing gas (arrows 31 and 32) in cooling relationship with generally vertically descending liquid. The cooling tower assembly 30 includes a fill assembly, generally designated 33, having a gas inlet opening 34 and a gas outlet opening 35. These openings enable the flow of gas, over substantially the entire vertical height (H) of fill assembly 33, into an exhaust plenum chamber 36 of the tower assembly. The outlet opening 35 is defined by a lower outlet portion 37 having a principal dimension generally inclined at an angle of about 5° to 15° to the vertical, and an upper outlet portion 38 having a principal dimension generally inclined at an angle of about 20° to 45° to the vertical. Upper outlet portion 38 begins from a location proximal lower outlet portion 37 at about ⅓ to ⅔ the vertical height (H) of fill assembly 33.

FIG. 2 further illustrates that cooling tower assembly 30 includes a vertical stack, generally designated 40, forming an exhaust port 41 positioned vertically over the exhaust plenum chamber 36 for exhaust of the gas in the generally vertical direction (arrow 42). An inner wall 43 of the vertical stack 40 is of a diameter sufficient to extend exhaust port 41 substantially vertically over both the lower outlet portion 37 and the upper outlet portion 38. Further, inner wall 43 extends to a location proximal an innermost upper portion 67 of fill assembly 33.

An exhaust fan, generally designated 45, is positioned in the exhaust port and includes at least one and generally a pair of fan blades 46 extending substantially to inner wall 43. Further, blade 46 extends substantially vertically over both the lower outlet portion 37 and the upper outlet portion 38. This configuration enables a smooth transition of the flow of gas exiting the outlet portions from the generally horizontal direction (arrows 31 and 32), through fill assembly 33, to the generally vertical direction (arrow 42), out of upper opening 47 and exhaust port 41.

Accordingly, the present invention removes or eliminates an upper inboard, triangular-shaped, fill portion from fill assembly 33 which was generally considered necessary to maximize cooling performance of the tower. The enlarged upper opening 47, created by the void and formed by the upper outlet portion 38, enables the application of a larger capacity fan 45 having a larger diameter fan blade 46. More air, thus, can be drawn through the cooling tower at a higher rate which permits the use of larger cells for more efficiently cooling. These larger cells are inherently less costly per unit of water flow than smaller cells.

While this configuration creates the favorable condition of widening the upper opening 47 of the exhaust plenum chamber 36, it also creates the unfavorable condition of reducing the transverse flow path length of the fill at the upper outlet portion which reduces cooling performance. It will be noted, however, that this removed upper inboard portion of the fill assembly is of minimal cooling benefit since the cooling air-to-descending water temperature differential at these portions of the fill are only about 1°–3° C. Hence, the loss of performance will be negligible compared to the structure size reduction benefits, discussed henceforth.

In accordance with the present invention, the upper opening 47 can be beneficially widened without adversely increasing the overall vertical height (H) or horizontal width (W) of the cooling tower assembly. In fact, the opposing fill assemblies 33, 33' of cooling tower assembly 30 can actually be moved closer together inwardly without adversely affecting the flow of exhausted air into the exhaust plenum chamber 36. This configuration results in an overall smaller structure size.

Moreover, because of the greater exhaust area at upper opening 47, the air flow from lower outlet portion 37 does not compete for space with exhausted air exiting the upper outlet portion 38 resulting in pressure losses. As set forth above, this problems occurs in shorter cooling towers incorporating more efficient film fill. The flow of air exiting the upper outlet portion 38 of fill assembly 33 (represented by arrow 31) can turn upwardly sooner and more smoothly to provide air to the outer portions of fan blade 46; while the flow of air through the gas lower outlet portion 37 of fill assembly 33 (represented by arrow 32) can turn upwardly central of the exhaust plenum chamber 36 to provide air to the inner portions of fan blade 46. Hence, the directional transition of the exhausted air from a horizontal direction (arrows 31 and 32), through the fill assembly 33, 33', to a vertical direction (arrow 42), through exhaust stack 40, is smooth. Pressure losses in the plenum chamber, therefore, are substantially reduced.

Briefly, it will be appreciated that the term "principal dimension" will refer to the general overall shape of these outlet portions, as compared to the drift eliminator walls. Because of the discontinuous nature of each individual cell of the fill sections, the outlet of each cell does not terminate at a definitive surface per se. However, cumulatively, the cells define a surface or face at the outlet portions 37, 38. This surface or face could therefore be generally planar or stair-stepped in nature positioned in a corner-to-corner declining position. Further, it will be understood that the terms "proximate" and "proximal" will refer to the continuity between two structures which are not necessarily, but can be, joined together. Hence, a small air gap between the two structures is permitted as long as the small gap only allows an inconsequential amount of air to flow therethrough. Further, the proximal locations of two opposing edges of two film fill sections will be understood to mean the continuity therebetween anywhere along those opposing edges.

Moreover, in accordance with the present invention, inner wall 43 extends to a location proximal innermost upper portion 67, 67' of fill assembly 33, 33'. In other words, the inner wall 43 extends to a position vertically over the innermost upper portions 67, 67' (FIG. 2). More specifically, the horizontal distance from one innermost upper portion 67 to the opposing innermost upper portion 67' is to be within at least ten percent (10%) of the diameter or width of exhaust port 41 defined by inner wall 43.

FIG. 2 illustrates that a water collecting basin 48 is disposed below the fill assemblies 33, 33' in a position to receive liquid gravitating therefrom. A liquid supply source 50, to be described below, supplies water to the fill assemblies generally across the entire width thereof. A suitable pumping structure (not shown) is operably coupled to basin 48 for removing deposited liquid therein and for delivering the water to equipment requiring the same for cooling and for returning the water to the supply source 50. If desired, a portion of the liquid removed may be recycled to through the water supply source 50 for further cooling prior to delivery to the equipment.

Vertical stack 40 is secured to the top face of tower assembly 30 and extends upwardly from central plenum chamber 36 to define exhaust port 41 for gas (air) exiting therefrom. Fan 45 is positioned within stack 40, coupled to a suitable source of power for actuation, to cause currents of air to be drawn through fill assemblies 33, 33' generally along arrows 31 and 32 and forced upwardly through plenum chamber 36 (in the direction of arrow 42) into vertical stack 40 for discharge through the exhaust port of the latter. Alternatively, the cooling tower may be operated by natural induction by the elimination of fan 45 in which case air would be induced to flow through the tower by means of natural convection of the warm exhaust air rising through chamber 36 and an extended stack 40.

Further, a drift eliminator wall 51 is disposed across the path of air exiting from the cooling section and in a generally upright position to prevent gravitating water from being carried as a spray into the plenum chamber. Wall 51 may be of any conventional type such as a series of spaced inclined baffles to permit the free flow of air therethrough but to prevent significant quantities of liquid droplets to escape into the plenum chamber 36.

In the preferred embodiment, fill assembly 33 includes an upper generally vertically oriented film fill section 52 which is disposed in an upper outboard corner portion cooling tower assembly 30. Upper film fill section 52 is defined by generally upright sides 56 and a generally horizontal top surface 53 and bottom surface 55. Film fill, of course, is much more efficient than splash fill or open film fill, and enables a shorter descending path of the water to provide the same quality of cooling. Hence, the vertical height (H) of fill assemblies 33, 33' can be advantageously decreased.

The present invention is therefore ideally suited for cross-flow cooling towers incorporating film fill. This decreased height in the cooling tower inherently includes a smaller upper opening 47 into the exhaust plenum chamber 36. The incorporation of film fill is to some extent counter-productive since film fill is more resistant to air flow, and generally necessitates a higher capacity, larger diameter fan. Of course, the maximum diameter of the fan blades 46 is dictated by the size of the upper opening 47. Thus, the present invention is capable of employing a larger diameter, higher capacity fan in combination with more efficient, but less flow resistant, film fill without increasing the overall cooling tower height. Moreover, the present invention enables a decrease in the overall width of the cooling tower.

FIG. 2 illustrates that the upper film fill section 52 is preferably of a width ($w_1$) spanning the upper portion of the fill assembly from the gas inlet opening 34 to the upper outlet portion 38. This distance ($w_1$) is substantially smaller than the total width (W) of the parallelogram-shaped lower portion of fill assembly 33 from the gas inlet opening 34 to the lower outlet portion 37 (i.e., the upper film fill section width ($w_1$) is preferably about 20% to 40% the total width (W)). Further, the vertical height ($h_1$) of upper film fill section is preferably between about 35% to about 75% of the overall height (H) of fill assembly 33.

Fill assembly 33 further preferably includes a sloping film fill section 57 having a principal plane inclined at an angle of about 20° to 70° to the vertical. The sloping film fill section extends from a location proximal the bottom surface 55 of upper film fill section 52 to a location proximal a lower inboard portion of fill assembly 33. Although this sloping film fill section 57 is shown as planar in FIGS. 1 and 2, it is understood that it could as well be stair-stepped configurations with individual steps cumulatively defining the sloping film fill section, or in curved or other shape which slopes in a corner-to-corner declining position as specified. Further, the present invention may include a lower inboard stack situated proximal the lower inboard bottom portion of the sloping film fill section, as described in U.S. Pat. No. 5,427,718 and herein incorporated by reference. Therefore, substantially all of the gas flowing from gas inlet opening 34 to gas outlet opening 35 flows through at least one of the upper and the sloping film fill sections, as well as the lower inboard stack, if utilized.

It will be appreciated that each of these film fill sections includes a plurality of sheets 58 (FIG. 3) cooperating to form the sections in integral units with adjacent sheets and defining passages or channels 60 for gas and liquid. The sheets 58 are substantially aligned to define a gas path, in the direction of arrows 31 and 32 in FIG. 2, extending generally from gas inlet opening 34 toward gas outlet opening 35 and being substantially vertically disposed to provide an essentially vertical path to liquid gravitating from liquid supply source 50.

FIG. 3 illustrates that the film fill sections are preferably of the corrugated-type which is extremely well suited for use in the fill assemblies 33, 33' in accordance with the present invention. The film fill comprises a plurality of corrugated sheets 58 with ridges 61 and grooves 62 disposed so that ridges of alternate sheets cross and abut against the ridges disposed between alternate sheets to form channels therebetween. The channels 60 have a constantly varying width from zero at the contact points between the sheets to a maximum of twice the distance between the ridges and grooves of individual sheets. In the illustrated embodiment, the corrugations of the type illustrated in the film fill extend throughout sloped fill section 57 with the sheets substantially vertically disposed to provide an essentially vertical path to liquid gravitating from liquid supply source 50 (FIG. 2). The sheets preferably are substantially parallel to the direction of air flow along flow paths (arrows 31 and 32) without unnecessary redirection of the air to avoid consequent increased fan power requirements.

Sheets 58 are preferably formed of a plastic material such as polyvinylchloride. Further, the sheets are preferably adhered to each other at the points of contact by means of solvent gluing at the interfaces. In this technique, solvent is applied at the contact points to form an adhesive with the plastic. The contact points adhere on solidification. In another embodiment the sheets are not adhered. Instead, they are hung and contact each other through spacer elements integral with the sheets.

The angle that the corrugations of sheets 58 assume with respect to sloped film fill section 57 may be varied substantially in accordance with transfer requirements of the particular tower. In one preferred embodiment, a major portion of the corrugations are an inclination of 0° to 45° to the horizontal. Horizontally flowing air along the path of arrows 31 and 32 has a relatively easy path through fill assembly 33 as it is not required to abruptly change its direction. This leads to lower fan power requirements. Simultaneously, the same fill provides a relatively tortuous path for the gravitating liquid to increase the redistribution and spreading of the liquid onto the fill surface. This principle of operation of sloped film fill section 57 is described in U.S. Pat. No. 3,917,764, incorporated herein by reference.

The remaining portions 68 of fill assembly 33 are preferably provided by splash-type fill or open film fill. Open film fill has lower wetted surface density, while splash fill is normally of lower air flow resistance and of lower cost than outer film fill. Splash fill is also of lower cooling capability than film fill, and it is thus often desirable to expose it to a lower water loading than that to which the film fill is exposed. On the other hand, the inner splash fill does serve a purpose by providing some cooling for the water not loaded onto the outer film fill.

Accordingly, in the preferred form, an open top perforated distribution pan or tray 65 is positioned directly above fill assembly 33 to permit water to gravitate through the apertures, perforations or nozzles (not shown) onto the top surface 53 of upper film fill section 52. Water is supplied to tray 65 through a supply pipe 66 of supply source 50.

For air flow reasons, however, tray 65 is dimensioned to only extend from the gas inlet opening 34 to a location proximal the innermost upper portion 67, or an intersection edge between gas upper outlet portion 38 and top surface 53 of upper film fill section 52. Hence, the tray does not extend horizontally over the upper outlet portion 38 of the splash fill section 68. This is because the distribution of vertically descending water onto the splash fill regions would be counter productive since a portion of the tray extending horizontally over this region may block and disturb the flow air exiting the upper outlet portion and exiting the exhaust plenum chamber through the vertical stack.

The less dense fill disposed inboard of the film fill, moreover, is more compatible with low water loadings flowing thereover, coupled with the low heat transfer temperature differentials that are common in these areas. This lower water loading is provided by downcomer pipes 70 which feed spray nozzles 71 positioned at appropriate levels above the upper fill section proximate upper outlet portion 38. As viewed in FIG. 2, a plurality of downcomer pipes 70 extend downwardly from water supply pipe 66 to drift eliminator 51. This downcomer piping and nozzle arrangement permits the exiting air to flow around and past the piping, and exhaust the air out through exhaust port 41 of vertical stack 40 without interference from tray 65.

In one embodiment, more water is distributed through the lower nozzles than through the upper nozzles because of the existence of a sizable lower film fill stack which is available for added cooling. This may be accomplished by using enclosed pipes and letting the siphon action dictate how much water is distributed through each downcomer.

In the preferred form, however, each downcomer is fed by open (vented) piping which eliminates the siphon effect, such as those described in U.S. Pat. No. 5,283,012. This configuration enables the natural backpressure from each nozzle 71 and associated pipe 70 to build a head of water in the downcomer pipe 70. This head provides the proper pressure so that the nozzle spray will be effective. Further, the nozzles and fill can be positioned so that there will be sufficient head between the nozzles and the pipe feeding the downcomers to develop appropriate pressure for proper water distribution.

A system for providing flow to the nozzles could also be utilized wherein generally horizontal piping at levels commensurate with desired nozzle elevations, and fed from a riser pipe feeding hot water to the tower and positioned vertically up the side of the tower, would divert flow to these nozzles without that flow going to the upper piping 66 and dropping through downcomers 70 to the spray nozzles. This system would not be as easy to balance and control as would be the preferred downcomer system.

What is claimed is:

1. A crossflow cooling tower assembly for contacting generally horizontally flowing gas in cooling relationship with generally vertically descending liquid, said tower assembly comprising:

a fill assembly having a gas inlet opening and a gas outlet opening enabling the flow of said gas, over substantially the entire vertical height of said fill assembly, from said gas inlet opening to said gas outlet opening and into an exhaust plenum chamber of said tower assembly;

said outlet opening being defined by a lower outlet portion having a principal dimension generally inclined at an angle of about 5° to 15° to the vertical, and an upper outlet portion having a principal dimension generally inclined at an angle of about 20° to 45° to the vertical, and beginning from a location proximal said lower outlet portion at about ⅓ to ⅔ the vertical height of the fill assembly; and a vertical stack forming an exhaust port positioned vertically over said exhaust plenum chamber for exhaust of said gas in the generally vertical direction, and having an inner wall defining a dimension sufficient to extend said exhaust port substantially vertically over both the lower outlet portion and the upper outlet portion such that said inner wall extends to a location proximal an innermost upper portion of said fill assembly.

2. The cooling tower assembly according to claim 1 further including:

an exhaust fan positioned in said exhaust port and including at least one fan blade extending proximate said inner wall, and vertically over both the lower outlet portion and the upper outlet portion, to enable a smooth transition of the flow of gas from the generally horizontal direction, through said fill assembly, to the generally vertical direction, out of said exhaust port.

3. The cooling tower assembly according to claim 1 wherein, said fill assembly comprises splash-type fill.

4. The cooling tower assembly according to claim 1 further including:

a liquid supply source for supplying said liquid to an upper portion of the tower assembly.

5. The cooling tower assembly according to claim 4 wherein, said liquid supply source more heavily distributes said liquid over the upper outer portion said fill assembly.

6. The cooling tower assembly according to claim 4 wherein, said liquid supply source includes at least one downcomer pipe for supplying liquid to a contacting surface of the upper outlet portion of said gas outlet opening.

7. The cooling tower assembly according to claim 4 wherein, said fill assembly includes an upper film fill section disposed in an upper outboard corner of the tower assembly proximal to said gas inlet opening and liquid supply source, said upper film fill section being defined by generally upright sides and opposing top and bottom surfaces.

8. The cooling tower assembly according to claim 7 wherein, said upper film fill section extends from said gas inlet opening to a location proximal the innermost upper portion of said fill assembly.

9. The cooling tower assembly according to claim 8 wherein, said liquid supply source includes a liquid distribution tray vertically above said top surface of said upper film fill section.

10. The cooling tower assembly according to claim 9 wherein, said liquid supply source includes at least one downcomer pipe for supplying liquid said upper outlet portion of said gas outlet opening.

11. The cooling tower assembly according to claim 7 wherein, said generally upright sides of said upper film fill section comprise about 35% to 75% of the vertical height of said fill assembly.

12. The cooling tower assembly according to claim 7 wherein, said fill assembly further includes a sloping film fill section having a principal plane inclined at an angle of about 20° to 70° to the vertical, and extending from a location proximal a portion of said upper film fill section.

13. The cooling tower assembly according to claim 12 wherein, said fill assembly further includes a lower film fill section disposed in a lower inboard corner of the tower proximal to said lower outlet portion, said lower film fill section being defined by generally upright sides extending about 20% to 60% of the vertical height of said fill assembly, and said sloping film fill section extending to a location proximal an upper portion of said lower film fill section so that substantially all of the gas flowing from said gas inlet opening to said gas outlet opening flows through at least one of said upper and sloping film fill sections.

14. The cooling tower assembly according to claim 12 wherein, said upper and sloping film fill sections comprising a plurality of sheets cooperating to form said sections in integral units with adjacent sheets and defining passages for gas and liquid, said sheets being substantially aligned to define a gas path extending generally from said gas inlet opening toward said gas outlet opening and being substantially vertically disposed to provide an essentially vertical path to liquid gravitating from said liquid supply source.

15. The cooling tower assembly according to claim 14 wherein, the remainder of said fill assembly further includes a splash-type fill.

16. The cooling tower assembly according to claim 12 wherein, an upper portion of said sloping film fill section terminates proximal said bottom surface of said upper film fill section.

17. The cooling tower assembly according to claim 1 wherein, the principal dimension of the gas upper outlet portion defines a generally planar surface.

18. The cooling tower assembly according to claim 1 wherein, said gas upper outlet portion is provided by a stair-stepped series of intermediate fill sections.

19. The cooling tower assembly according to claim 7 wherein, the remainder of said fill assembly further includes an open-type film fill.

20. A crossflow cooling tower assembly for contacting generally horizontally flowing gas in cooling relationship with generally vertically descending liquid, said tower assembly comprising:

a fill assembly having a gas inlet opening and a gas outlet opening enabling the flow of said gas, over substantially the entire vertical height of said fill assembly, from said gas inlet opening to said gas outlet opening and into an exhaust plenum chamber of said tower assembly;

said outlet opening being defined by a lower outlet portion having a principal dimension generally inclined at an angle of about 5° to 15° to the vertical, and an upper outlet portion having a principal dimension generally inclined at an angle of about 20° to 45° to the vertical, and beginning from a location proximal said lower outlet portion at about ⅓ to ⅔ the vertical height of the fill assembly;

a vertical stack forming an exhaust port positioned vertically over said exhaust plenum chamber for exhaust of said gas in the generally vertical direction, and having an inner wall defining a dimension sufficient to extend said exhaust port substantially vertically over both the lower outlet portion and the upper outlet portion; and a liquid supply source for supplying said liquid to an upper portion of the tower assembly, including at least one downcomer pipe for supplying liquid to a contacting surface of the upper outlet portion of said gas outlet opening.

21. The cooling tower assembly according to claim 20 further including:

an exhaust fan positioned in said exhaust port and including at least one fan blade extending proximate said inner wall, and vertically over both the lower outlet portion and the upper outlet portion, to enable a smooth transition of the flow of gas from the generally horizontal direction, through said fill assembly, to the generally vertical direction, out of said exhaust port.

22. The cooling tower assembly according to claim 21 wherein, said liquid supply source more heavily distributes said liquid over the upper outer portion said fill assembly.

23. The cooling tower assembly according to claim 20 wherein, said fill assembly includes an upper film fill section disposed in an upper outboard corner of the tower assembly proximal to said gas inlet opening and liquid supply source, said upper film fill section being defined by generally upright sides and opposing top and bottom surfaces.

24. The cooling tower assembly according to claim 23 wherein, said upper film fill section extends from said gas inlet opening to a location proximal an innermost upper portion of said fill assembly.

25. The cooling tower assembly according to claim 23 wherein, said generally upright sides of said upper film fill section comprise about 35% to 75% of the vertical height of said fill assembly.

26. The cooling tower assembly according to claim 23 wherein, said fill assembly further includes a sloping film fill section having a principal plane inclined at an angle of about 20° to 70° to the vertical, and extending from a location proximal a portion of said upper film fill section.

27. The cooling tower assembly according to claim 26 wherein, said fill assembly further includes a lower film fill section disposed in a lower inboard corner of the tower proximal to said lower outlet portion, said lower film fill section being defined by generally upright sides extending about 20% to 60% of the vertical height of said fill assembly, and said sloping film fill section extending to a location proximal an upper portion of said lower film fill section so that substantially all of the gas flowing from said gas inlet opening to said gas outlet opening flows through said film fill sections.

28. The cooling tower assembly according to claim 20 wherein, the principal dimension of the gas upper outlet portion defines a generally planar surface.

29. The cooling tower assembly according to claim 20 wherein, said gas upper outlet portion is provided by a stair-stepped series of intermediate fill sections.

30. The cooling tower assembly according to claim 20 wherein, said liquid supply source includes a plurality of spaced-apart downcomer pipes for supplying liquid to a contacting surface of the upper outlet portion of said gas outlet opening.

* * * * *